United States Patent Office 3,324,393
Patented June 6, 1967

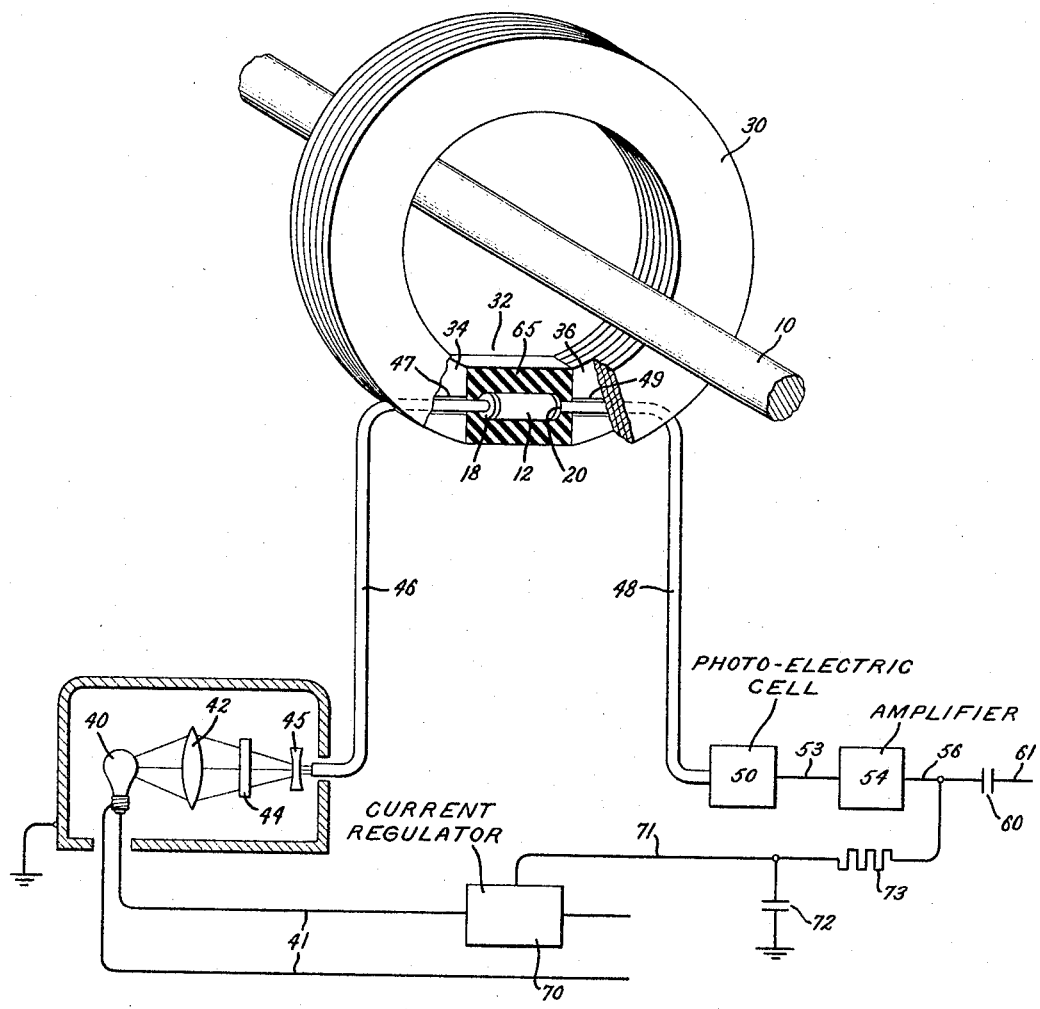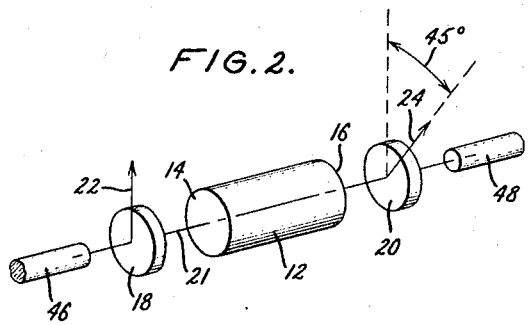

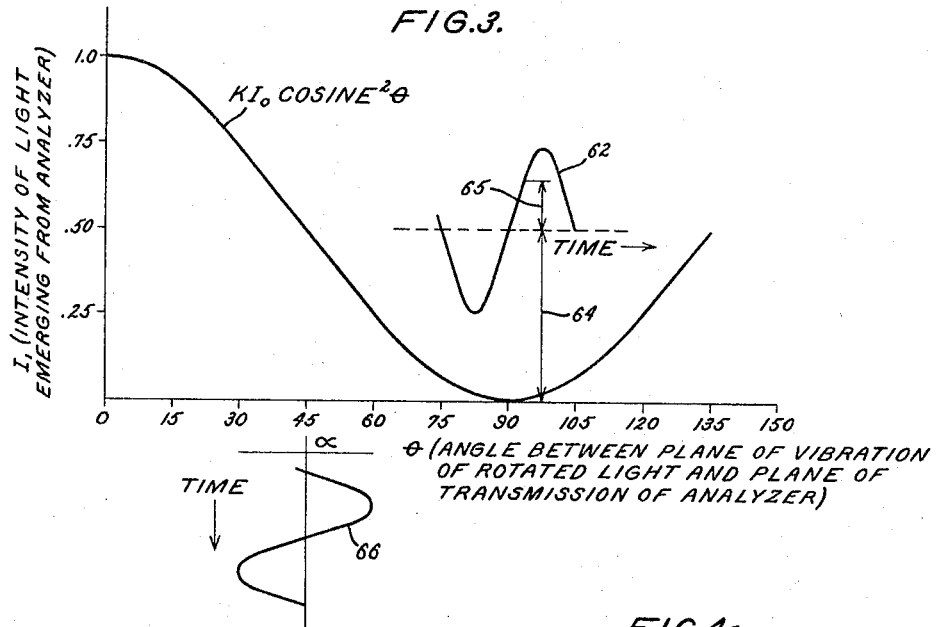
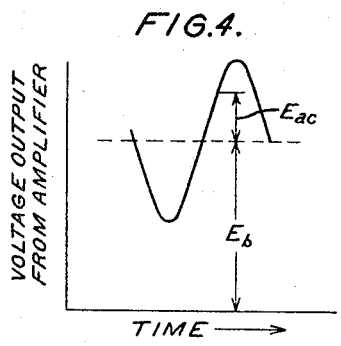
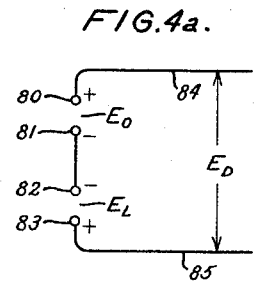
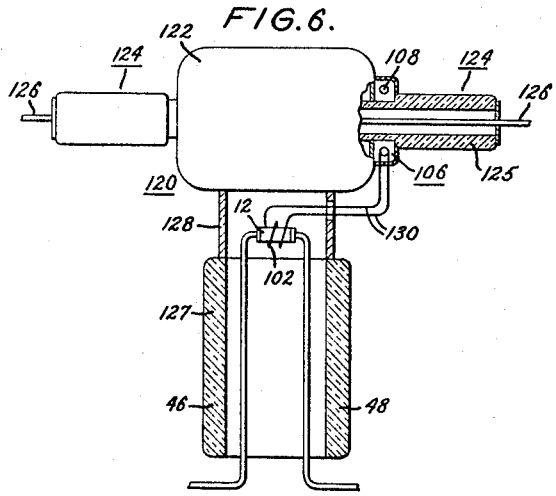
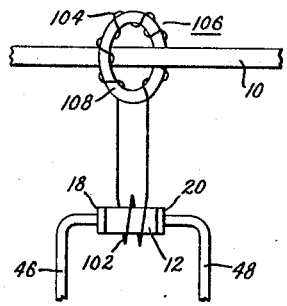
INVENTORS:
EDWARD J. CASEY,
CHARLES H. TITUS,
BY William Freedman
ATTORNEY.

3,324,393
MAGNETO-OPTICAL ELECTRIC CURRENT
SENSING ARRANGEMENT
Edward J. Casey, Media, and Charles H. Titus, Newtown Square, Pa., assignors to General Electric Company, a corporation of New York
Filed July 26, 1963, Ser. No. 297,882
17 Claims. (Cl. 324—96)

This invention relates to a magneto-optical arrangement for sensing the value of electric current in a high voltage conductor.

The invention is particularly concerned with a magneto-optical arrangement for providing, in a low voltage circuit, an output signal that is a faithful and accurate representation of the current flowing in a high voltage conductor.

The usual approach to obtaining such a representation of the current in a high voltage conductor is to employ a current transformer that has its primary winding connected in series with the high voltage conductor and its secondary winding at or near ground potential. Unfortunately, current transformers are quite expensive when used in high voltage applications, primarily because the electrical insulation between the primary winding and the secondary winding must be capable of withstanding full line voltage, together with any transient voltages appearing on the power system. Insulation with such capabilities is quite costly, particularly when present in the large amounts neded in typical current transformers.

An object of our invention is to provide simple and inexpensive means for obtaining a faithful and accurate representation of the current flowing in a high voltage conductor and which means obviates a major portion of the expensive insulation required in a current transformer of corresponding voltage rating.

In our current sensing means, we develop a concentrated magnetic field that has an intensity substantially proportional to the magnitude of the current in the high voltage conductor. Within this magnetic field we locate a light transparent Faraday element that is capable of rotating the plane of vibration of a beam of plane polarized light by an angular amount substantially proportional to the intensity of the magnetic field. A beam of plane polarized light of a constant intensity is transmitted to the Faraday element where the plane of vibration of the polarized light is rotated through an angle substantially proportional to the magnetic field intensity. The light emerging from the Faraday element is transmitted through a light polarizing element, called an analyzer, that varies the intensity of the light emerging from the analyzer as a predictable function of the amount of rotation experienced by the light in traversing the Faraday element. Thus, light having an intensity varying as a predictable function of the current in the high voltage conductor is developed. This light is transmitted to a photo-electric cell at or near ground potential that develops an output current proportional to the intensity of the light received and, thus, an output signal from which can be derived a representation of the current in the high voltage conductor. Although the photoelectric cell is at ground potential, the Faraday element and the analyzer are located adjacent the high voltage conductor. Despite this, however, no expensive insulation need be provided between these elements because the information is transmitted through the light beam. Thus, the photoelectric cell can be placed sufficiently remote from the high voltage conductor that no special insulation is needed between the high voltage conductor and the photo-electric cell and its associated low voltage circuit.

Prior efforts to utilize the above principles for sensing current in a high voltage conductor have not been entirely successful for a number of different reasons. First of all, the intensity of the light leaving the analyzer has not been anywhere near a linear function of the magnetic field intensity, and schemes to correct this departure from linearity have appeared too costly and complicated to justify their inclusion. Secondly, there have been so many unpredictable extraneous factors that have affected the intensity of the light over its entire path from source to photo-electric cell that the amount of rotation occurring in the Faraday element has been difficult to accurately measure. One example of such an extraneous factor has been the contamination of optical surfaces that has occurred through contact with air, dust and other foreign matter.

Thus, another object of our invention is to provide a magneto-optical current sensing arrangement that is capable of accurately varying the intensity of the light emerging from the analyzer as a substantially linear function of the magnetic field intensity.

Still another object is to provide a magneto-optical current sensing arrangement that has a high immunity to degradation through variable extraneous factors such as accumulation of foreign matter on optical surfaces.

Still another object is to provide compensating means that renders the current sensing arrangement insensitive to any changes in the light-producing and transmitting characteristics of the system that might occur over a prolonged period of operation.

In carrying out our invention in one form, we orient the polarizer and analyzer in such a manner that their planes of transmission are at an angle of approximately 45 degrees to each other. Thus, when there is no rotation of the plane of vibration of the polarized light passing through the Faraday element between the polarizer and the analyzer, the angle $\theta$ between the plane of transmission of the analyzer and the plane of vibration of the polarized light entering the analyzer is approximately 45 degrees. Any rotation of the plane of vibration of the light passing through the Faraday element between the polarizer and the analyzer will cause this angle $\theta$ to be approximately 45 degrees plus the angular amount of rotation occurring in the Faraday element. Since the intensity of the light emerging from the analyzer is proportional to $COS^2 \theta$, it can be shown that the intensity of this light will change as a substantially linear function of the angular rotation in the Faraday element for rotations of about ±20 degrees. Thus by operating in the range of $\theta$=approximately 45 degrees ±20 degrees, the intensity of the light emerging from the analyzer can be varied as a substantially linear function of the intensity of the magnetic field that is producing the rotation in the Faraday element.

In a preferred embodiment of our invention, the light beam that is passed through the Faraday element is developed in a region remote from the high voltage conductor where the voltage is near ground potential. The polarizer, the Faraday element, the analyzer, and the magnetic means for energizing the Faraday element are all disposed in a region where the voltage approximates that of the high voltage conductor. The light beam is conveyed from the low voltage region to the polarizer through a first fiber optics element that has its output end disposed adjacent the polarizer. The beam is then directed through the polarizer, the Faraday element, and the analyzer, after which it enters a second fiber optics element that conveys it to a utilization point located in a region where the voltage is near ground potential. The fiber optics elements, being of a high quality insulating material, do not affect the existing insulation that is otherwise required to isolate the high voltage conductor from ground.

For a better understanding of our invention reference may be had to the following description taken in conjunction with the accompanying drawings, wherein:

FIG. 1 is a diagrammatic view of a current sensing system embodying one form of our invention.

FIG. 2 is an enlarged exploded view of a portion of the system of FIG. 1.

FIG. 3 is a graphical representation of certain operating characteristics of the system.

FIG. 4 is a graphical representation of an output quantity derived from a portion of the system of FIG. 1.

FIG. 4a is a schematic showing of a circuit used in a modified form of our invention.

FIG. 5 shows a modified form of the invention.

FIG. 6 shows the form of the invention depicted in FIG. 5 applied to a high voltage circuit breaker.

Referring now to FIGS. 1 and 2, there is shown an electric conductor 10 which is at a high voltage. It is desired to sense the amount of current flowing through this conductor at any given instant. It will first be assumed that the current flowing through the conductor 10 is alternating current. It will be further assumed that this conductor is a typical high voltage power line that has a certain rated continuous current and under abnormal conditions, such as short circuits, is subject to currents as high as 20 to 40 times rated continuous current.

The desired current-sensing function is performed by a magneto-optical system comprising a Faraday or optical element 12 in the form of a transparent cylinder of extra dense flint glass. This optical element 12 has a pair of spaced-apart polished, planar end surfaces 14 and 16, to which transparent light-polarizing elements 18 and 20 are cemented. Preferably, a transparent optical cement having an index of refraction similar to that of the optical element 12 is used for this purpose. As will soon appear more clearly, these elements 18, 12 and 20 are used for modulating a beam of light that is directed successively through them in a direction substantially parallel to the longitudinal axis 21 of the cylindrical optical element 12.

The light polarizing elements 18 and 20 are preferably thin disks of polarizing material, such as are available from the Polaroid Corporation under the trade name Polaroid HN32D Spx Glass Laminated Linear Polarizer. As is well known, a beam of light passing through either of these polarizing elements in a direction parallel to the longitudinal axis 21 will emerge as a beam of plane polarized light having its plane of vibration in the plane of transmission of the polarizing element. The rectangular component of the light at right angles to the plane of transmission will be absorbed or otherwise removed by the polarizing element.

The element 18 is referred to hereinafter as the polarizer and the element 20 as the analyzer. For reasons which will soon be explained in greater detail, the plane of transmission of the polarizer is disposed at approximately 45 degrees to the plane of transmission of the analyzer. This angular relationship is best illustrated in FIG. 2, where the respective planes of transmission of the polarizer and the analyzer are indicated by arrows 22 and 24. Light passing through either of these polarizing elements parallel to the axis 21 will emerge from the polarizing element with its plane of vibration parallel to the arrow of that particular polarizing element.

In a preferred embodiment of our invention, the beam of plane polarized light that is directed through the Faraday element 12 along its axis 21 is substantially monochromatic. We utilize the Faraday effect for rotating the plane of vibration of this beam of polarized light by an angular amount that is substantially proportional to the current in the high voltage conductor 10. According to the Faraday effect, a beam of plane polarized light of a given wave length passing through an optically active element such as 12 will have its plane of vibration rotated through an angle that varies substantially linearly directly in accordance with the intensity of a magnetic field traversing the Faraday element in a direction parallel to the path of the light beam. The angular direction that the plane of vibration will be rotated is reversed when the direction of the magnetic field traversing the Faraday element is reversed.

In utilizing this Faraday effect to sense the current through the electric conductor 10, we first develop a concentrated magnetic field that has an intensity that is substantially proportional to the current flowing through the conductor 10 and then applying this magnetic field to the Faraday element 12 in a direction parallel to its longitudinal axis 21. For developing this magnetic field, we provide a core 30 of magnetizable material that surrounds the electric conductor 10. This core 30 contains a gap 32 between two spaced apart pole pieces 34 and 36 located on opposite sides of the gap 32. In a known manner, current flowing through the conductor 10 induces a magnetic field in the core that traverses the gap 32 between the spaced apart pole pieces 34 and 36. If the current flowing through the conductor 10 is alternating, the direction of the magnetic field reverses with each alternation of current. The gap 32 is made of sufficient length to assure that saturation of the magnetic circuit 30, 32 does not occur at any current up to the maximum current that is anticipated through the electric conductor 10. Thus, the intensity of the magnetic field traversing the gap 32 is substantially proportional to the current flowing through the conductor 10 for all currents up to the maximum anticipated current.

The Faraday element 12 is located in the gap 32 with its longitudinal axis 21 generally parallel to the direction of the magnetic field traversing the gap. Thus, a magnetic field substantially proportional to the current in the conductor 10 traverses the Faraday element 12 substantially parallel to its longitudinal axis. This, in turn, causes the plane of vibration of the plane-polarized light passing through the Faraday element 12 to be rotated through an angle that is substantially proportional to the current in the conductor 10. When the direction of the magnetic field is reversed, the direction of rotation is reversed, but the angular amount of rotation continues to be substantially proportional to the current in conductor 10.

It can be shown that the intensity $I_1$ of the light emerging from the analyzer 20 is equal to $KI_0 \cosine^2 \theta$, where K is a constant; $I_0$ is the intensity of the light incident to the analyzer, and $\theta$ is the angle between the plane of vibration of the incident light and the plane of transmission of the analyzer. This relationship is plotted in FIG. 3, where $\theta$ is the abscissa and $I_1$ is the ordinate.

It will be noted from FIG. 3 that there is a range of about 20 degrees on either side of $\theta = 45°$ where the output intensity $I_1$ varies as a substantially linear function of $\theta$. It is in this range that we operate our current sensing scheme. To this end, we have located the plane of transmission of the polarizer at approximately 45° to the plane of transmission of the analyzer. Hence, if there is zero current in the conductor 10 and thus no rotation of the plane of vibration of the light passing through the Faraday element 12, the intensity of the light emerging from the analyzer will be equal to .5K times the intensity of the light reaching the analyzer. If a current flows through the conductor 10 that causes the plane of vibration to be rotated through an angle $\alpha$, then the polarized light incident to the analyzer will have an angle $\theta = 45° + \alpha$. The intensity of the light emerging from the analyzer can be determined for any rotation through an angle $\alpha$ by reading from the illustrated curve the value of $I_1$ when $\theta = 45° + \alpha$. For example if $\alpha$ is $+15°$, then $\theta = 60°$ and $I_1 = .25KI_0$. If $\alpha$ is $-15°$, then $\theta = 30°$ and $I_1 = .75KI_0$. Since $\alpha$ is substantially proportional to the current in conductor 10, and the change in output intensity $I_1$ is substantially proportional to $\alpha$ in the selected operating range, the change in output intensity $I_1$ will be substantially proportional to the current in the conductor 10 in the selected operating range.

Referring to FIG. 3, if α is varying as shown at 66 in response to a sinusoidal current through conductor 10, then the intensity of the light emerging from the analyzer will vary in accordance with a curve 62, obtained by plotting on a time scale instantaneous values of $I_1$ for instantaneous values of $\theta$ as α varies. It will be noted that this emerging light has a component 64 of constant intensity and a component 65 of sinusoidally varying intensity. The manner in which this light emerging from the analyzer is used will soon be described.

The light beam that is passed through the polarizing elements 18, 20 and the Faraday element 12 is derived from a suitable light source 40. In the illustrated embodimen this light source 40 is an incandescent lamp connected across an energizing circuit 41. A fixed portion of the light from source 40 is focused by a suitable condensing lens 42, which directs the light through a filter 44 that admits substantially monochromatic light. After passing through the monochromatic filter 44, the light enters a collimating lens 45, emerging therefrom as a collimated beam. This beam of light is directed into a fiber optics light conveyor 46 that extends from a point at ground potential up to a point adjacent the high voltage conductor 10. This fiber optics element is of a conventional construction, such as is disclosed, for example, in U.S. Patents 2,828,260—O'Brien or 2,922,516—Norton. The output end of the fiber optics element 46 extends through a small passageway 47 provided in the core 30 and having its axis aligned with longitudinal axis 21 of Faraday element 12.

This fiber optics element 46 conveys light from its input end to its output end in such a manner that the light traversing the fiber optics element is in the form of a highly collimated beam of light. Upon emerging from the fiber optics element, this beam of light is directed through the elements 18, 12, 20 to provide for modulation of the beam in the manner described hereinabove.

The modulated light emerging from the analyzer 20 is conveyed to a point at ground potential by means of a second fiber optics element 48, which is preferably substantially identical to the first element 46. The input end of this second fiber optics element 48 extends through a small passage 49 in the core 30, also aligned with the longitudinal axis 21 of the Faraday element 12. The light emerging from the output end of the fiber optics element 48 has an intensity that is only slightly less than that of the light entering the fiber optics element but at any rate, there is a fixed ratio between the intensity of this emerging light and that of the light entering the fiber optics element 48.

The beam emerging from the output end of the fiber optics element 48 is supplied to a photoelectric cell 50 of a conventional construction that produces an output signal that is directly proportional to the intensity of the light received by the cell. This output signal from the photoelectric cell, which is preferably a current signal, is supplied through a conductor 53 to a suitable amplifier 54 that produces an output voltage directly proportional to the input current from the photoelectric cell 50. This output voltage from the amplifier 54 appears on the conductor 56.

Assume now that the modulated light supplied to the fiber optics element 48 has an intensity such as depicted at 62 in FIG. 3, i.e., with an alternating component superimposed on a constant amplitude or zero frequency component. The light emerging from the fiber optics element 48 will have substantially this same intensity, and thus the current from the photocell 50 will have a wave form that is substantially the same as that shown at 62. The output voltage from the amplifier 54 will have this same wave form. This wave form is illustrated in FIG. 4, where it is shown as comprising a zero frequency component $E_b$ and an alternating component $E_{ac}$ superimposed thereon. A capacitor 60 connected in series with the output conductor 56 from the amplifier 54 will eliminate the zero frequency component $E_b$ of voltage from this output signal, and, accordingly, on the conductor 61 on the output side of the capacitor 60, a voltage will appear that corresponds in amplitude and wave form to the alternating component $E_{ac}$ of the output signal from the amplifier 54. This voltage will be a faithful and accurate representation of the current flowing through the high voltage conductor 10 and can be used for a variety of different purposes, such as relaying or metering.

It should be noted that any substantial change in the intensity of the beam of light reaching the photo-electric cell 50 will change the output voltage appearing on the output conductor 61. So long as this change in intensity results only from Faraday rotation in the Faraday element 12, the output voltage will be a faithful replica of the current flowing through conductor 10. But if a substantial change in intensity should be produced by some other factor, then there would be an impairment of the accuracy of the current sensing arrangement. We have reduced the chances for such changes in intensity by relying upon fiber optics light conveyors, by encapsulating the key elements of the optical system in a matrix of a suitable resin, and by cementing the fiber optics elements, the polarizing elements, and the Faraday elements together. The fiber optics elements, being encapsulated in a plastic matrix and being constituted by a solid material of unvarying composition, are much less susceptible to contamination than would be a lens system with beams passing through a gaseous medium. The encapsulating and cementing together of the elements 18, 12, and 20 prevents these particular elements from being contaminated by dust or other foreign matter. The plastic matrix in which the elements 18, 12 and 20 are encapsulated is shown at 65. This matrix also surrounds the ends of the fiber optics elements 46 and 48 which project into the gap 32. The fiber elements are surrounded along their length by a protective sheath of a suitable plastic material having a good electrical insulating properties.

Preferably, the core 30 is at the same potential as the high voltage conductor 10. The elements 12, 18, and 20 are also at approximately this same potential. Thus, no expensive electrical insulation is needed between the high voltage conductor 10 and the parts 10, 12, 18 and 20 located thereadjacent. As previously explained, information is transmitted between the grounded parts of the system and those parts at high potential through the light beams that passes through fiber optics elements 46 and 48. The fiber optics elements are of a good electrical insulating material and are so long that they introduce no appreciable problem of an electric breakdown between the high voltage parts and ground.

Even if the lamp 40 is supplied with a constant current, its light output can change slightly after a prolonged period of operation. In measuring systems that have very strict accuracy requirements, it is desirable that such changes be compensated for in order to render the output signal insensitive to them. We effect such compensation by providing a regulator 70 for the current supplied to the lamp 40 and by controlling this regulator in accordance with the zero frequency component $E_b$ of the output voltage from the amplifier 54. This zero frequency voltage component $E_b$ is indicative of the intensity of the light supplied to the system by the source 40 and should remain fixed despite any change in the characteristics of the source 40. To this end, the regulator 70 is supplied with a control voltage equal to the zero frequency component $E_b$ of the output from amplifier 54. The regulator acts to vary the current flowing through the lamp supply circuit 41 sufficiently to maintain this zero frequency voltage component $E_b$ constant. Thus, any changes in light intensity resulting from changes in the characteristics of the lamp are compensated for by the regulator 70. Any other factors, aside from Faraday rotation, that might change the intensity of the light passing through the optical system will also affect the zero frequency component $E_b$ of the output voltage, and such changes are also compensated for by the action of the regulator 70 in maintaining the zero frequency component $E_b$ constant.

To assure that the regulator 70 will receive a control signal that corresponds to the zero frequency component $E_b$ of the output voltage, a filtering capacitor 72 is connected between the regulator control circuit 71 and ground. This capacitor provides a low impedance path to ground through which the alternating component $E_{ac}$ of the output signal is bled off, leaving only the zero frequency component to be supplied to the regulator. A high ohmic resistor 73 connected in series with the capacitor assures that the shunt path through the filtering capacitor 72 around the output capacitor 60 will not prevent the a-c component $E_{ac}$ of the output voltage from appearing on output conductor 61.

The details of the regulator have not been shown since any suitable conventional form of regulator can be used. A simple regulator suitable for this purpose is described on pages 219–221 of the book, Electronics in Industry by G. M. Chute published in 1946 by McGraw-Hill Book Co. of New York, N.Y. In the regulator described by Chute, a regulated voltage GV, which depends upon the output of a generator, is compared with a reference voltage RV to provide a signal which is used to control the output of the generator in such a manner that the regulated voltage GV is maintained substantially constant. In using this circuit in the present application, the voltage across capacitor 72, corresponding to voltage $E_b$ of FIG. 4, is made the regulated voltage, and this regulated voltage is compared with a reference voltage corresponding to RV of Chute to derive a signal which controls a generator in the regulator 70 supplying current to the lamp 40. When so controlled, the generator supplies to the lamp 40 a regulated amount of current that acts to hold voltage $E_b$ constant despite changes in the lamp characteristics.

Under certain conditions, the current flowing through the high voltage conductor 10 may have a transient D.-C. component that requires several electrical cycles to decay. One of our objects is to provide an indication of this transient D.-C. component in the output signal that appears on the output side of the capacitor 60. We are able to obtain such an indication, first of all, because we have a large enough air gap 32 to prevent our magnetic circuit 30, 32, from being saturated by the effects of this D.-C. component, even under the most severe conditions anticipated. Accordingly, this transient D.-C. component is represented in the light signal that reaches the photoelectric cell 50 and is, in turn, represented in the output current from the photoelectric cell 50 and in the output voltage from the amplifier 54. The capacitor 60 is of such a capacitance that it permits passage of this rapidly decaying D.-C. component to the output conductor 61. Thus, this rapidly decaying D.-C. component will appear in the output signal on the output side of the capacitor 60.

The filtering capacitor 72 presents a relatively low impedance to this rapidly decaying D-C transient and hence this D-C transient is not reflected in the signal that reaches current regulator 70. Accordingly, the regulator 70 is insensitive to such D-C transients and does not vary the light output of source 40 in response to these D-C transients. This is desirable because these D-C transients are variations in the quantity being measured rather than variations in the characteristics of the measuring system, and it is only this latter type of variation that the regulator 70 is intended to compensate for.

It will be apparent from the above explanation that for sensing alternating current the ideal angular relationship between the plane of transmission of the polarizer and that of the analyzer is 45 degrees since this marks the midpoint of the substantially linear portion of the curve of FIG. 3. But it is to be understood that minor changes can be made in this angular relationship so long as these changes do not result in the angle $\theta$ of FIG. 3 extending onto the non-linear portion of the curve for currents within the range where it is desired to obtain an accurate representation of line current. In a current-sensing system that is to be used in providing a signal for a relay protecting a high voltage power line, it is typically required that the maximum error at 20 times rated continuous current be no more than 10%. To provide this type of accuracy in the illustrated system, we adjust the initial angle between our polarizer and analyzer to a value wherein the angle of rotation $\alpha$ resulting from currents of 20 times normal continuous current when added to the initial angle still yields a value of $\theta$ that is on the substantially linear portion of the curve. This substantially linear portion extends from about 65 degrees to 25 degrees. To obtain operation in this region, the initial angle should be between 35 and 55 degrees and, preferably, between 40 and 50 degrees.

For currents between 20 and 40 times normal continuous current, it is usually not objectionable in a protective relaying system if the output quantity remains substantially constant with increases in input above 20 times rated continuous current. But the output quantity should not decrease with increases in input current even in this range of 20 to 40 times rated continuous current. Accordingly, we select our initial angular relationship so that the maximum negative value of input current and the maximum positive value of input current (i.e., 40 times rated continuous current) do not increase the range of $\theta$ beyond zero to 90 degrees. Preferably, we maintain $\theta$ between 25 and 65 degrees even for operation between the maximum negative and maximum positive values of input current so that even for these extreme values of current, we obtain an output that is linearly related to the input current.

The current sensing means of a protective relaying system must be accurate at low currents as well as high currents. We are able to satisfy this accuracy requirement even at small fractions of rated continuous current because in this range, the curve of FIG. 3 has a high degree of linearity.

Although we have described our current sensing means hereinabove as being used for sensing the magnitude of A-C currents in the power line 10, it should be apparent that it can also be used for sensing the magnitude of D-C currents. In such applications, operation on the linear part of the curve of FIG. 3 can be achieved if the angle between the polarizer and analyzer is set at either limit of the linear portion of the curve and the angle of rotation $\alpha$ produced by current flow in the normal direction is in a direction to produce an angle $\theta$ on the linear portion of the curve. If it is desired to accurately sense the magnitude of the current during an abnormal condition of reverse current flow, then the initial angle should be adjusted in the same way as described above for A-C measurements.

Another modification that is desirable when direct current is being sensed is that means be provided for deriving a voltage proportional to the intensity of the light source and for subtracting this voltage from the output voltage from the amplifier 54. The difference voltage will be representative of the current in the power line 10, and this difference voltage can be used as the ultimate output quantity for measuring or relaying purposes.

A circuit for effecting this subtraction of voltage is shown schematically in FIG. 4a. Here the output voltage from the amplifier, designated $E_0$, is applied to a pair of terminals 80 and 81, and a voltage $E_L$ representative of the intensity of the lamp output is applied to a second pair of terminals 82 and 83 connected in series with the first pair of terminals. These voltages are applied in opposed, or bucking, relationship so that the voltage $E_D$ appearing across the lines 84 and 85 is equal to the difference between them. This difference voltage is representative of the current in the power line 10 and is used as the ultimate output quantity for measuring or relaying purposes. Voltage $E_L$ is of such a value that no voltage appears across 84 and 85 when the current through the main power line 10 is zero. As an added refinement, a suitable regulator (not shown) is used to maintain the intensity of the lamp output substantially constant.

Although the spaced-apart end surfaces 14 and 16 of our optical element 12 may be precisely parallel to each other, we prefer to orient these surfaces so that they are out of parallel just slightly, say by about one degree. In a preferred embodiment of our invention the entrance surface 14 is made perpendicular to the longitudinal axis 21 but the exit surface 16 is slightly out of normal to this axis. This nonperpendicular relationship helps to prevent any light rays that are reflected from the exit surface 16 as the beam traverses it from reaching the exit surface a second time by reflection off the entrance surface. Due to having passed three times through the Faraday element, such rays would have a plane of vibration rotated three times the rotation occurring in the main beam. Ordinarily, the quantity of this multiple reflected light is so small as not to impair the accuracy of our current sensing arrangement, but even minor effects from such light can be substantially eliminated by the above described approach.

The maximum current that can be sensed with accuracy by the arrangement of FIG. 1 can be limited by saturation of the core 30 when a certain field strength is approached. For currents above this level there is little increase in the intensity of the magnetic field that is applied to the Faraday element 12. A much higher maximum current can be sensed with accuracy by the arrangement shown in FIG. 5.

This arrangement of FIG. 5 corresponds in numerous respects to that of FIG. 1, and identical reference numerals have therefore been used to designate corresponding parts. The main structural difference between the arrangement of FIG. 5 and that of FIG. 1 is in the means for developing the magnetic field that is applied to the Faraday element. In FIG. 5, the Faraday element is located in an air core magnetic circuit spaced from the conductor 10. Flux is developed in the air core by current flowing through a helix 102 that is wound about the Faraday element 12. This helix 102 is connected across the secondary winding 104 of a current transformer 106.

The current transformer 106 comprises an iron core 108 that surrounds the conductor 10. The secondary winding 104 is wound about this core in a uniformly distributed manner similar to that used in a conventional bushing-type current transformer. The helix 102, which is connected across the current transformer secondary 104, has a very low impedance, and hence it imposes a very low impedance burden on the current transformer secondary. The low impedance of this burden enables the current transformer to operate with a high degree of accuracy and not to saturate at primary currents as high as 50,000 amperes. Since the helix 102 has an air core, it does not introduce any appreciable saturation that could interfere with obtaining a magnetic field that has an intensity substantially proportional to the current through the conductor 10 at high currents, e.g., currents as high as 50,000 amperes. This is more than forty times the rated continuous current of many typical power circuits, such as circuit 10.

The magnetic field developed by the helix 102 is applied to the Faraday element 12 in substantially the same manner as described in connection with FIG. 1, and thus rotates the plane of vibration of the polarized light traversing the Faraday element in substantially the same manner as described in connection with FIGS. 1–4. The remaining elements of the current sensing arrangement of FIG. 5 are substantially the same as described in connection with FIGS. 1–4 and hence will not be further described here.

In the arrangement of FIG. 5, the current transformer secondary 104 and the helix 102 are preferably at substantially the same potential as the primary conductor 10. Thus, there is no need to provide any electrical insulation between the primary and the secondary. The insulating fiber optics elements 46 and 48 convey light between the grounded parts (not shown in FIG. 5) of the system and the high voltage parts, just as in FIG. 1.

FIG. 6 shows an application of the current sensing scheme of FIG. 5. Here the current sensing scheme is used to sense the value of current flowing through an electric circuit breaker 120. This circuit breaker is in most respects of a conventional design, for example, that shown in U.S. Patent 3,009,983—Oppel, assigned to the assignee of the present invention. More specifically, the circuit breaker 120 comprises a metallic tank or housing 122 at high potential in which circuit interrupting elements (not shown) are mounted. A pair of terminal bushings 124 project into the tank through its opposite ends. Each of these terminal bushings comprises a porcelain shell 125 and a central conductor 126. The conductor 126 carries current through bushing 124 and electrically interconnects the circuit interrupting elements within the tank 122 with a power circuit at the outer end of the bushings. In the circuit breaker of the aforesaid Oppel patent, when the circuit breaker is closed, the tank 122 is at the same potential as the high voltage conductor 126. When the circuit breaker is open, the tank 122 is at a potential intermediate that of the two conductors 126; and the porcelain shells 125 electrically isolate the tank from the two conductors. The tank 122 is supported on a hollow porcelain column 127 that serves also to electrically isolate the tank 122 from ground. A cylindrical metal enclosure 128 is positioned between the tank 122 and the top of the porcelain column 127. This enclosure 128 is at the same potential as the metallic tank 122.

Surrounding the porcelain shell 125 of one of the bushings is the current transformer 106 of FIG. 5. The core 108 of this current transformer is preferably electrically connected to the tank 122 so as to be at the same potential as the tank. The secondary winding 104 is connected through leads 130 to opposite terminals of the helix 102, which is located in the cylindrical housing 128.

The Faraday element is positioned within the helix 102 in the same manner as shown in FIG. 5, and the polarizer 18 and analyzer 20 are disposed at opposite ends of the Faraday element in the same manner as described hereinabove. The fiber optics elements 46 and 48 extend through the hollow porcelain column 127 and act as previously described to convey the light beam between points at ground potential at the bottom of porcelain column 127 and the parts such as the Faraday element 12 which are in a high potential region.

While we have shown and described particular embodiments of our invention, it will be obvious to those skilled in the art that various changes and modifications may be made without departing from our invention in its broader aspects. We therefore intend in the appended claims to cover all such changes and modifications as fall within the true spirit and scope of our invention.

What we claim as new and desire to secure by Letters Patent of the United States is:

1. A magneto-optical transducer for measuring varying currents in a power line over a current range extending from a fraction of rated continuous current to at least twenty times rated continuous current, comprising:
   (a) an optical element having a pair of spaced-apart end surfaces,
   (b) means for directing a beam of light through said optical elements between said end surfaces,
   (c) a polarizer through which said beam of light is transmitted prior to entering said optical element so that light entering said optical element is substantially plane polarized,

11

(d) an analyzer through which said beam of light is transmitted upon leaving said optical element, (d') means sensitive to said electric currents for developing a magnetic field that has an intensity that varies as a direct function of the magnitude of said electric current, (e) means for applying said magnetic field to said optical element in a direction generally parallel to the path followed by said beam of polarized light to rotate the plane of vibration of said beam of polarized light through an angle varying in magnitude as a direct function of the magnetic field intensity, (e') said magnetic field being so controlled that currents of twenty times rated continuous current produce angular rotations no greater than 20 degrees, (f) said polarizer and analyzer having planes of transmission which are oriented at approximately 45° relative to each other so that magnetically rotating the plane of vibration of polarized light passing through said optical element produces a change in the intensity of the light leaving said analyzer that is substantially linear with respect to angular rotation for angular rotations of as much as ±20 degrees.

2. In a magneto-optical transducer for sensing currents in an alternating current power line over a current range extending from a fraction of rated continuous current to at least 20 times rated continuous current, (a) an optical element having a pair of spaced-apart end surfaces, (b) means for directing a beam of light through said optical element between said end surfaces, (c) a polarizer through which said beam of light is transmitted prior to entering said optical element so that light entering said optical element is substantially plane polarized, (d) an analyzer through which said beam of light is transmitted upon leaving said optical element, (e) means sensitive to said electric currents for developing a magnetic field that has an intensity that varies as a direct function of the magnitude of said electric current, (f) means for applying said magnetic field to said optical element in a direction generally parallel to the path followed by said beam of polarized light to rotate the plane of vibration of said beam of light by an angular amount varying as a direct function of the magnetic field intensity, (g) said polarizer and said analyzer having planes of transmission which are oriented at an angle of between 35 and 55 degrees relative to each other, the exact orientation of said planes of transmission being such that the angular rotation of said plane of vibration produced by varying said electric current between a negative value of 20 times rated continuous current and a positive value of 20 times rated continuous current produces a substantially linear variation in the intensity of the light emerging from said analyzer when plotted against angular rotation.

3. The transducer of claim 2 in which the planes of transmission of the polarizer and analyzer are at an angle of between 40 and 50 degrees relative to each other.

4. A current sensing arrangement for sensing the current in a high voltage conductor comprising:

(a) light beam developing means including a light source for developing a beam of light, (b) an optical element having a pair of spaced-apart end surfaces, (c) a first light conductor of solid insulating material for conveying said beam of light from said beam developing means to said transparent optical element, (d) a polarizer located closely adjacent to one end surface of said optical element and between said end surface and said solid light conductor so that the light beam emerging from said solid light conductor is substantially plane polarized prior to entering said optical element, (e) an analyzer located closely adjacent the other end surface of said optical element and through which said beam of light is transmitted upon emerging from said optical element, (g) a second light conductor of solid insulating material for conveying said beam of light from said analyzer to a utilization point at the opposite end of said second solid light conductor, (h) magnetic means for developing and applying to said optical element a magnetic field that varies in intensity as a direct function of the current in said high voltage conductor, said magnetic field traversing said optical element in a direction generally parallel to the path followed by said light beam, thereby rotating the plane of vibration of the polarized light traversing said optical element by an angular amount varying as a direct function of the current in said high voltage conductor, (i) said polarizer and analyzer, said optical element, and said magnetic means being located in a region that is at a high voltage approximating that of said high voltage conductor, (j) said beam developing means and said utilization point being located in regions of low voltage compared to that of said high voltage conductor.

5. The current sensing arrangement of claim 4 in which said magnetic means comprises a core having a gap therein in which said polarizer, analyzer, and optical element are located, said core having first and second passages extending therethrough and intersecting said gap in substantially aligned locations on opposite sides of the gap, said first solid light conductor extending through one of said passages and terminating in an output end closely adjacent said polarizer, and said second solid light conductor extending through the other of said passages and having an input end closely adjacent said analyzer.

6. The current sensing arrangement of claim 4 in which said magnetic means comprises a magnetizable core surrounding said high voltage conductor, a secondary winding inductively linked to said core, and magnetic field-producing means energized from said secondary winding for applying said magnetic field to said optical element, said magnetic field-producing means having a magnetic circuit that is substantially unsaturated at currents through said high voltage conductor as high as ten times rated continuous current.

7. The current sensing arrangement of claim 4 in which said polarizer and analyzer have their planes of transmission oriented at approximately 45° relative to each other.

8. A magneto-optical system for sensing alternating current in an A.C. circuit, (a) an optical element having a pair of spaced-apart end surfaces, (b) means including a light source for developing a beam of light, (c) means for directing said beam of light through said optical element between said end surfaces, (d) a polarizer through which said beam of light is transmitted prior to entering said optical element so that light entering said optical element is substantially plane polarized, (e) an analyzer through which said beam of light is transmitted upon leaving said optical element, (f) means sensitive to said electric current for developing a magnetic field that has an intensity that varies as a direct function of the magnitude of said electric current, (g) means for applying said magnetic field to said optical element in a direction generally parallel to the path followed by said beam of polarized light to rotate the plane of vibration of said beam of light by an angular amount varying as a direct function of the magnetic field intensity, (h) said polarizer and said analyzer having planes of transmission which are oriented at a fixed angle of between 35° and 55° relative to each other so that the light emerging from said analyzer is composed of a substantially uniform intensity component and a superimposed component that has an intensity varying as a direct function of the angular rotation of said plane of vibration, (i) regulating means responsive to said uniform intensity component but not to said varying intensity component for controlling the intensity of said light source in such a manner that said uniform intensity component remains substantially constant despite changes in the characteristics of said light source.

9. A magneto-optical system for sensing alternating current in an A-C circuit, (a) an optical element having a pair of spaced apart end surfaces, (b) means including a light source for developing a beam of light, (c) means for directing said beam of light through said optical element between said end surfaces, (d) a polarizer through which said beam of light is transmitted prior to entering said optical element so that light entering said optical element is substantially plane polarized, (e) an analyzer through which said beam of light is transmitted upon leaving said optical element, (f) means sensitive to said alternating electric current for rotating the plane of vibration of said beam of light as it passes through said optical element by an angular amount varying as a direct function of the magnitude of said current, (g) said polarizer and said analyzer having planes of transmission which are oriented at a fixed angle of between 35° and 55° relative to each other so that the light emerging from said analyzer is composed of a substantially uniform intensity component and a superimposed component that has an intensity varying as a direct function of the angular rotation of said plane of vibration, (h) means for developing an intermediate electric signal that has a zero frequency component proportional to said uniform intensity component and a varying component superimposed upon said zero frequency component that has a magnitude varying in proportion to said superimposed light component, (i) regulating means sensitive to said zero frequency component for controlling said system in such a manner that said zero frequency component remains substantially constant despite changes in the characteristics of said light source, (j) and output means developing an output electric signal that is a substantial replica of the varying component of said intermediate signal.

10. The system of claim 9 in which said regulating means controls the intensity of said beam of light to maintain said zero frequency component substantially constant despite changes in the characteristics of said light source.

11. The current sensing arrangement of claim 9 in combination with means for rendering said regulating means insensitive to a rapidly decaying D-C component of current in said A-C circuit.

12. The current sensing arrangement of claim 9 in which said output means is capable of developing an output signal that contains a component representing a rapidly decaying D-C component of current in said A-C circuit, and in which means is provided for rendering said regulating means unresponsive to said rapidly decaying D-C component.

13. The transducer of claim 1 in which said spaced-apart end surfaces of said transparent optical element are slightly out of parallel so as to reduce the chances that any component of said light beam reflected from the exit surface of said optical element will again reach the exit surface after multiple passes through the optical element.

14. In the transducer of claim 1, (a) said means for applying the magnetic field to said optical elements comprising a core of magnetizable material including spaced apart pole pieces defining a gap therebetween, (b) means for mounting said transparent optical element in said gap with said end surfaces facing said pole pieces, (c) means for mounting said polarizer in said gap in a location closely adjacent one end surface of said optical element and between said one end surface and one of said pole pieces, and (d) means for mounting said analyzer in said gap closely adjacent the other end surface of said optical element and between said other end surface and said other pole piece.

15. A magneto-optical system for measuring varying current in a conductor, (a) an optical element having a pair of spaced-apart end surfaces, (b) means including a light source for developing a beam of light, (c) means for directing said beam of light through said optical element between said end surfaces, (d) a polarizer through which said beam of light is transmitted prior to entering said optical element so that light entering said optical element is substantially plane polarized, (e) an analyzer through which said beam of light is transmitted upon leaving said optical element, (f) means sensitive to said electric current for rotating the plane of vibration of said beam of light as it passes through said optical element by an angular amount varying as a direct function of the magnitude of said current, (g) said polarizer and said analyzer having planes of transmission which are oriented at a fixed angle of between 35° and 55° relative to each other so that the light emerging from said analyzer is composed of a uniform intensity component representing the intensity of the light passing through said analyzer when no current flows through said conductor and another component superimposed on said uniform intensity component representing the current flowing in said conductor, (h) means for developing a first electric signal that is representative of said two components of light, (i) means for developing a reference electric signal representative of the prevailing intensity of said light source, (j) and means for comparing said reference electric signal with said first electric signal and for deriving an output electric signal proportional to the difference between said first electric signal and said reference signal.

16. The system of claim 15 in which the current in said conductor is direct current.

17. In electric apparatus comprising a housing at a high voltage, a terminal bushing projecting into said housing, and an insulating column on which said housing is mounted, the combination of:

(a) means including a magnetic core mounted about said bushing adjacent said housing for developing a magnetic field that varies as a direct function of the current flowing through said bushing, (b) light beam developing means including a light source for developing a beam of light, (c) an optical element having a pair of spaced-apart end surfaces, (d) a first light conductor of solid insulating material for conveying said beam of light from said beam-developing means to said transparent optical element, (e) a polarizer located closely adjacent to one end surface of said optical element and between said end surface and said solid light conductor so that the light beam emerging from said solid light conductor is substantially plane polarized prior to entering said optical element,
(f) an analyzer located closely adjacent the other end surface of said optical element and through which said beam of light is transmitted upon emerging from said optical element,
(g) a second solid light conductor for conveying said beam of light from said analyzer to a utilization point at the opposite end of said second solid light conductor,
(h) means for applying said magnetic field to said optical element in such a manner that the field is generally parallel to the path followed by said light beam,
(i) said polarizer and analyzer, said optical element, and said magnetic means being located in a region that is at a high voltage approximating that of said high voltage conductor,
(j) said beam developing means that said utilization point being located in regions of low voltage compared to that of said high voltage conductor.

References Cited

UNITED STATES PATENTS

| 1,866,631 | 7/1932 | Dorff | 88—61 |
| 1,961,706 | 6/1934 | Pajes | 88—61 |
| 2,913,665 | 11/1959 | Bomke | 324—96 X |
| 2,974,568 | 3/1961 | Dillon | 88—61 |
| 3,068,739 | 12/1962 | Hicks | 88—1 |
| 3,245,314 | 4/1966 | Dillon | 88—61 |

OTHER REFERENCES

N. B. Ritchey: "Self-Contained U.H.F. Wattmeter," in Engineering Dept., publication of Advanced Dev. Labs., Sylvania Elec. Prod. Inc., pp. 10, 11, 22 and 23, December 1949.

RUDOLPH V. ROLINEC, *Primary Examiner.*